(12) United States Patent
Wogrin et al.

(10) Patent No.: US 10,683,930 B2
(45) Date of Patent: Jun. 16, 2020

(54) HYDRAULIC MACHINE HAVING AN ADJUSTABLE DISPLACEMENT VOLUME, TRANSMISSION ARRANGEMENT HAVING THE HYDRAULIC MACHINE, AND METHOD FOR CONTROLLING THE TRANSMISSION ARRANGEMENT

(71) Applicant: Robert Bosch GmbH, Stuttgart (DE)

(72) Inventors: Benjamin Wogrin, Nersingen (DE); Christian Hagg, Nersingen (DE); Erich Ilk, Augsburg (DE); Matthias Mueller, Langenau (DE); Norman Brix, Leipheim (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 16/045,060

(22) Filed: Jul. 25, 2018

(65) Prior Publication Data

US 2019/0032779 A1  Jan. 31, 2019

(30) Foreign Application Priority Data

Jul. 27, 2017  (DE) ........................ 10 2017 212 921

(51) Int. Cl.
*F16H 61/472*  (2010.01)
*F16H 61/70*  (2006.01)
*F16H 61/42*  (2010.01)
*F16H 61/04*  (2006.01)

(52) U.S. Cl.
CPC ........... *F16H 61/472* (2013.01); *F16H 61/42* (2013.01); *F16H 61/70* (2013.01); *F16H 61/0403* (2013.01)

(58) Field of Classification Search
CPC .............................. F16H 61/42; F16H 61/0403
See application file for complete search history.

(56) References Cited

U.S. PATENT DOCUMENTS

| | | | |
|---|---|---|---|
| 4,939,954 A * | 7/1990 | Walzer | B60W 30/18 477/68 |
| 4,947,687 A * | 8/1990 | Martini | F16H 47/02 477/68 |
| 5,505,113 A * | 4/1996 | Wiest | F16H 47/02 477/52 |
| 6,202,016 B1 * | 3/2001 | Stephenson | F16H 61/0403 475/121 |
| 9,243,701 B2 * | 1/2016 | Mueller | F16H 41/24 |
| 2016/0201294 A1 * | 7/2016 | Aoki | F16H 61/42 701/99 |
| 2016/0312888 A1 * | 10/2016 | Schmuttermair | F16H 61/42 |

FOREIGN PATENT DOCUMENTS

DE    10 2015 215 013 A1    2/2017

* cited by examiner

*Primary Examiner* — Thomas E Lazo
(74) *Attorney, Agent, or Firm* — Maginot, Moore & Beck LLP (57) ABSTRACT

A hydraulic machine, in particular for a transmission arrangement, has an adjustable displacement volume and an adjusting device configured to adjust the displacement volume. The adjusting device is connected to a control unit so that the adjusting device is configured to be actuated in accordance with a setpoint value of the displacement volume. A transmission arrangement includes the hydraulic machine. A method for controlling the transmission arrangement is disclosed.

15 Claims, 4 Drawing Sheets

HYDRAULIC MACHINE HAVING AN ADJUSTABLE DISPLACEMENT VOLUME, TRANSMISSION ARRANGEMENT HAVING THE HYDRAULIC MACHINE, AND METHOD FOR CONTROLLING THE TRANSMISSION ARRANGEMENT

This application claims priority under 35 U.S.C. § 119 to patent application no. DE 10 2017 212 921.2, filed on Jul. 27, 2017 in Germany, the disclosure of which is incorporated herein by reference in its entirety.

BACKGROUND

The disclosure relates to a hydraulic machine having an adjustable displacement volume in accordance with the preamble of Patent claim 1, to a transmission arrangement having the hydraulic machine according to Patent claim 8, and to a method for controlling the transmission arrangement according to Patent claim 11.

A transmission arrangement of the generic type has a hydraulic motor, by which a transmission input of a mechanical, shiftable transmission is driven. In order that a gear change can take place reliably, the hydraulic motor, that is to say the input of the manual transmission, has to be free from torque during the shift. After a shift request, there is therefore always the question as to the time at which said freedom from torque is achieved.

Since the torque of a hydraulic machine is proportionally dependent on its displacement volume, solutions having a detection unit for the displacement volume are known from the prior art. If the value zero is detected via said detection unit, this is synonymous with the freedom from torque. The detection unit is frequently configured as a zero position switch.

It is a disadvantage of said zero position switches that the provision thereof on or in the hydraulic machine represents additional complexity. For example, costs accrue for the switch/sensor, the cables, plugs and for the respective integration into different housing variants of the hydraulic machine, and for the maintenance of the zero position switch. Operation is possibly no longer possible in the case of a defect of the switch. A restricted availability of the traction drive or of the vehicle can thus occur. In some cases, it is also very difficult to position the zero position switch in or on the hydraulic machine.

As an alternative, time-based actuation means are known from the prior art, in the case of which an adjustment time of the displacement volume of the hydraulic machine, after the expiration of which adjustment time the displacement volume is zero, including a safety reserve, is estimated. It is a disadvantage of this that the great variance in real operation, for example of the pressure medium temperature, the machine temperature, the adjustment pressure, the working pressure and component-related series variation, is not taken into consideration. In the case of the method of time-based estimation of the load-free or torque-free state, it can occur, for example in the case of technical defects, that the hydraulic machine still has ("provides") a finite displacement volume and therefore a torque after expiration of the time period, since the adjustment dynamics of the hydraulic machine are approximated by way of a time model which does not provide for defect. If the shift then nevertheless occurs, that is to say under load, this can lead to damage of the transmission up to its failure. If, in contrast, the time-based estimation is parameterized conservatively in order to prevent damage of this type, unnecessarily long shift times can occur which can then possibly bring the vehicle into a critical situation in the case of a traction force interruption of said vehicle, which traction force interruption accompanies the shift operation.

The specification of DE 10 2015 215 013 A1 discloses a solution, in the case of which the torque of the second hydraulic machine which is coupled to the manual transmission is regulated to zero or close to zero for the gear change. This takes place via the regulation of the differential pressure across the working connectors of the second hydraulic machine. To this end, it is proposed in one variant to equip the first hydraulic machine of the hydraulic circuit with a differential pressure regulator. In another variant, the regulation of the differential pressure takes place indirectly via the regulation of the control pressure, with which the adjustment device of the first hydraulic machine is loaded in order to adjust its displacement volume. As a consequence, the freedom from torque or the virtually torque-free state of the second hydraulic machine is ensured solely via the first hydraulic machine. Although this also makes the use of an inexpensive fixed displacement machine as a hydraulic motor possible, the regulating quality and regulating dynamics can cause problems.

SUMMARY

In contrast, the disclosure is based on the object of providing a hydraulic machine, in particular a hydraulic motor, having an adjustable displacement volume for a transmission arrangement, by way of which hydraulic machine reliable shifting of the transmission arrangement is made possible. Furthermore, the disclosure is based on the object of providing a transmission arrangement with reliable shifting behavior, and a method for reliably controlling a shift operation of the transmission arrangement.

The first object is achieved by way of a hydraulic machine having the features of Patent claim 1. The second object is achieved by way of a transmission arrangement having the features of Patent claim 8, and the third is achieved by way of a method having the features of Patent claim 11.

Advantageous developments of the respective disclosure are described in the respective subclaims.

A hydraulic machine, in particular a hydraulic machine which can be operated as a hydraulic motor, has an adjustable displacement volume. The hydraulic machine can be configured, for example, as an axial piston machine of swash plate or bent axis design. Other designs are also of course possible, however, for example radial piston machines. In order to adjust its displacement volume, the hydraulic machine has an adjustment device. The latter is connected to a control unit, in particular is connected in signal terms, by which control unit said adjustment device can be actuated or is actuated in accordance with a setpoint value of the displacement volume. According to the disclosure, the control unit is configured in such a way that at least one dynamic parameter of the adjustment can be determined via said control unit as a function of a setpoint value change of the displacement volume which can take place, in particular, in a sudden or ramp-shaped manner or in a plurality of jumps and/or ramps, and as a function of at least one state variable of a working pressure medium of the hydraulic machine, which working pressure medium flows, in particular, in a working flow path of the hydraulic machine, and as a function of a dynamic model of the adjustment behavior of the hydraulic machine. In particular, the dynamic parameter is an adjustment time which preferably begins at a time of the setpoint value change, and the new setpoint value can be reached or is reached after expiration thereof by the displacement volume.

In comparison with the solutions of the prior art which operate in a purely time-based and estimating manner and in the case of which the adjustment time is assumed with a safety reserve, with the result that it can be surmised with high probability that the displacement volume has reached its new setpoint value, the incorporation according to the disclosure of the state variable/variables and of the dynamic behavior provides the option of a temporal reproduction of the adjustment. In this way, a time is known precisely or can be estimated by the control unit, at which time there is the requested new displacement volume in accordance with the new setpoint value. In this way, more rapid and reliable shifting of a manual transmission which is connected in series with the hydraulic machine is made possible, the hydraulic machine and the manual transmission forming a transmission arrangement. One refinement of a transmission arrangement according to the disclosure will be described further below.

In the case of the hydraulic machine according to the disclosure, a zero position switch or position switch or pivoting angle switch or a corresponding sensor can be dispensed with, in particular, since the displacement volume and its adjustment time can be estimated with high precision. This saves costs for the sensor, cable, plug and the integration of sensors of this type, and for the maintenance and service thereof. If a defect of a switch or sensor of this type frequently has the effect in the prior art that operation has to be interrupted, this disadvantage is eliminated.

A dynamic parameter as an alternative or in addition to the adjustment time is an (in particular, mean) adjustment speed, at which the new setpoint value can be reached or is reached by the displacement volume. Here, the adjustment time and the mean adjustment speed are in a functional interrelationship.

In one development, the adjustment device can be actuated electroproportionally. Here, it is either controlled electroproportionally, with the result that an actual value of the displacement volume in the stationary state corresponds approximately to the setpoint value of the displacement volume. In one more precise development, the displacement volume can be regulated via the control unit.

As has been mentioned, in particular in the case of shift operations of a manual transmission which is connected to the hydraulic machine, a freedom from torque of the hydraulic machine is important. This is the case, in particular, when the new setpoint value is equal to zero. As an alternative, the new setpoint value can be dimensioned in such a way that a moment of inertia of the hydraulic machine can be compensated for. In this case, it is different than zero and is sufficient for the hydraulic machine to be driven hydrostatically, instead of being driven in a coupled motion by the downstream manual transmission.

In one development, the at least one state variable is a working pressure or a temperature of the working pressure medium or of the hydraulic machine. The determination of the dynamic parameter is more precise if the working pressure and the temperature of the working pressure medium are incorporated as state variables.

In one development, the dynamic parameter can be determined as a function of at least two temperatures, temperature levels or temperature ranges. Here, one of the temperatures is preferably an operating temperature or an operating temperature range, for example 60° C., and the other temperature is a warm-up temperature or a warm-up temperature range. In the latter, the working pressure medium has a temperature which differs from the operating temperature, for example on account of ambient conditions. A simple development has merely the dependence on the operating temperature.

In one development, the dynamic parameter, the setpoint value change and the at least one state variable are stored in the form of a characteristic diagram in the control unit.

In one development, a dynamic model of the displacement volume as a function of the setpoint value change and the dynamic parameter is stored in the control unit. As a result, a time course of the displacement volume as a function of the setpoint value change and the dynamic parameter can be estimated and/or determined via the control unit. The knowledge of the displacement volume as a function of time is a great advantage for control, regulating and/or, in particular, shifting strategies which are based on the value of the displacement volume. Said control, regulating and/or shifting strategies can be improved greatly using the assumed displacement volume which results from the dynamic module. In particular, following steps in the control, regulation and/or shifting can be brought forward with knowledge of the assumed displacement volume, since the time when the new setpoint value of the displacement volume is reached is known.

Although, as has already been stated, the determination of the dynamic parameter and, in particular, the dynamic model of the displacement volume can make a sensor system for the detection of the displacement volume superfluous, in one development, the hydraulic machine has such a detection device, via which at least one zero value or a zero position of the displacement volume, at which it has the value which is equal to zero, can be detected. In this way, there is added safety in the control, regulation and/or shifting. In addition, what is known as "condition monitoring" of the hydraulic machine can take place by the dynamic parameter which is determined by the control unit and the displacement volume which is determined from the dynamic model via the control unit being compared with detected values. A change in a deviation between determined and detected values as viewed over the service life of the hydraulic machine is then a measure for the wear of said hydraulic machine.

Accordingly, in one development, the control unit is configured in such a way that values of the detection device and the determined values of the dynamic parameter and/or of the dynamic model can be stored and can be compared with one another via said control unit.

The abovementioned transmission arrangement is provided, in particular, for a traction drive, in particular for a mobile machine. It has a first hydraulic machine which can be coupled to a drive machine, for example to a diesel engine. Furthermore, it has the hydraulic machine which can be operated as a hydraulic motor and is configured according to at least one aspect of the preceding description. This will be called second hydraulic machine in the following text. The two hydraulic machines are arranged in a hydraulic circuit, the second hydraulic machine being capable of being coupled, or being coupled, to a manual transmission of the transmission arrangement, which manual transmission has at least two transmission stages. In this way, a torque can be transmitted between it and the manual transmission. Shifting of the transmission stages, that is to say, in particular, disengaging of the engaged transmission stage and subsequent engaging of the new transmission stage, can be controlled via a control unit of the transmission arrangement. In order to shift or change the transmission stages, the displacement volume of the second hydraulic machine can be adjusted to zero or to a value close to zero via the control unit. At the value zero, a driving shaft of the second hydraulic machine is free of torque. A value close to zero is suitable if it is to be prevented that the second hydraulic machine is driven in a coupled motion by the manual transmission. According to the disclosure, the shifting can be controlled, in particular is controlled, via the control unit as a function of the dynamic parameter which is determined as described above. It is of course possible here that the dynamic parameter can be determined via the control unit of the second hydraulic machine or via the control unit of the transmission arrangement.

As has already been mentioned, it is important in the case of shifting or changing of the transmission stages that no torque is transmitted between the second hydraulic machine and the manual transmission. Here, shifting is to be understood to mean at least the disengaging of an engaged transmission stage and, in addition, the engaging of the transmission stage which is to be newly engaged. Since, in traction mode, the second hydraulic machine has a displacement volume which is different than zero, the object of adjusting the displacement volume of the second hydraulic machine back to zero or close to zero is set by an incoming shift request. The time at which the new setpoint value of the displacement value of zero or close to zero is reached can then be estimated with high precision with the use of the (above-described) determination according to the disclosure of the dynamic parameter, in particular the adjustment time. A sensor-based or switch-based detection of the displacement volume can therefore be dispensed with. Moreover, conservatively estimated time reserves for the adjustment time to be assumed are dispensed with, since the solution according to the disclosure is oriented considerably more closely to the real behavior of the adjustment.

A method according to the disclosure for controlling a shift or change of transmission stages of the transmission arrangement has a step "receiving of a shift request by way of the control unit" and a step "actuation of the adjustment device of the second hydraulic machine in accordance with a new setpoint value of the displacement volume, which new setpoint value is linked with the shift request, via the control unit". As has already been mentioned multiple times, the new setpoint value is either zero or is dimensioned in such a way that a moment of inertia of the second hydraulic machine is compensated for. According to the disclosure, a step "determination of the dynamic parameter, in particular the adjustment time, as a function of the existing setpoint value, the new setpoint value, the at least one state variable and the dynamic adjustment behavior of the hydraulic machine" takes place via the control unit at the same time as or after the receiving of the shift request. In other words, a determination is made in a model-based or characteristic diagram-based manner as to when the new setpoint value can be reached by the displacement volume. The result is therefore a model-assisted or characteristic diagram-assisted estimation.

In one development, the method has a step "starting of a time measurement of the adjustment time" at the same time as the step "actuation of the adjustment device in accordance with a new setpoint value . . . ". Therefore, the time measurement for the adjustment time begins to run with the actuation in accordance with the setpoint value change.

In one development of the method, a step "actuation of the manual transmission for disengaging the currently engaged transmission stage, in particular actuation of a control valve, via which a hydraulic cylinder for disengaging the transition stage is controlled, via the control unit" takes place at the expiration or after the expiration of the determined adjustment time.

In one development, steps "receiving of a signal, in particular of a positional or position sensor of the manual transmission, that the transmission stage is disengaged, by way of the control unit"; "synchronization of the new transmission stage, via the control unit"; "actuation of the manual transmission for engaging the new transmission stage, via the control unit"; and "increasing of the displacement volume of the second hydraulic machine via the control unit" follow in the method.

In one development of the method, a step "checking of at least one shift condition, via the control unit" takes place before the step "actuation of the adjustment device in accordance with the new setpoint value for the displacement volume, which new setpoint value is linked to the shift request".

The applicant reserves the right to direct a patent application to a traction drive having the transmission arrangement according to the disclosure.

BRIEF DESCRIPTION OF THE DRAWINGS

One exemplary embodiment of a transmission arrangement according to the disclosure and one exemplary embodiment of a method according to the disclosure for controlling the transmission arrangement are shown in the drawings. The disclosure will now be described in greater detail using the figures of said drawings, in which.

DETAILED DESCRIPTION

Figure 1:
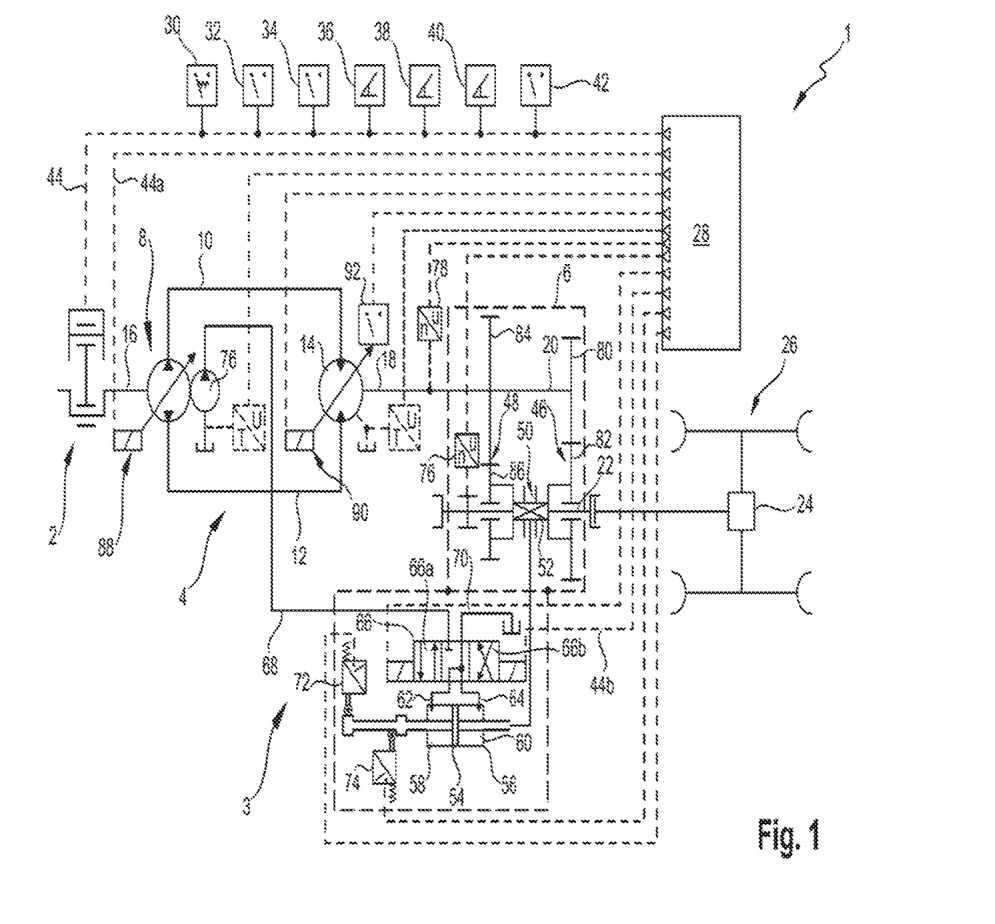
FIG. 1 shows a circuit diagram of one exemplary embodiment of a traction drive having a transmission arrangement in accordance with one exemplary embodiment.

In accordance with FIG. 1, a traction drive 1, for example the traction drive of a mobile machine, has a transmission arrangement 3 with a drive machine 2 which is configured as a diesel engine, a hydrostatic transmission 4 and a manual transmission 6 which has two stages in the exemplary embodiment. The hydrostatic transmission 4 has a first hydraulic machine 8 which is configured as an axial piston pump of swash plate design and is connected fluidically in a closed, hydraulic circuit via two working lines 10, 12 to a second hydraulic machine 14 which is configured as an axial piston motor of bent axis design. The first hydraulic machine 8 is coupled via a drive shaft 16 to the drive machine 2. A driving shaft 18 of the second hydraulic machine 14 is coupled to an input shaft 20 of the manual transmission 6. An output shaft 22 of the manual transmission 6 is coupled to a differential 24 of a two-wheel axle 26 of the traction drive 1. The two hydraulic machines 8, 14 in each case have an adjustable displacement volume. Here, in the exemplary embodiment which is shown, the first hydraulic machine 8 is configured in such a way that it can operate in all four quadrants and in both torque directions both as a hydraulic pump and as a hydraulic motor. In the exemplary embodiment which is shown, the second hydraulic machine 14 has an adjustment range between a value of its displacement volume $V_{HM}$ which is equal to zero and a positive maximum value $V_{HMmax}$.

Furthermore, the transmission arrangement 3 has a control unit 28, in particular for controlling the torque $M_{HM}$ of the driving shaft 18 and the transmission input shaft 20, and the displacement volumes $V_{HP}$, $V_{HM}$ of the two hydraulic machines 8, 14. A shift request device 30, a gear selection device 32, a driving direction selection device 34, an accelerator pedal 36, a crawler gear selection device 38, a brake pedal 40 and an automatic selection device 42 are connected in signal terms to the control unit 28. All of the mentioned devices 30 to 42 are connected in signal terms via a CAN bus 44 firstly to the control unit 28 and secondly at least to the drive machine 2.

The manual transmission 6 has a first transmission stage 46 with a small transmission ratio and a second transmission stage 48 with a greater transmission ratio of the rotational speed $n_A$ of the output shaft 23 to the rotational speed $n_{HM}$ of the input shaft 18. Furthermore, the manual transmission 6 has a claw coupling 50 which is configured without a synchronizer ring. An actuator 52 of the claw coupling 50 is coupled rigidly to a double-acting piston 54 of an actuating cylinder 56. The latter has two identical pressure medium spaces 58, 60 which are separated by the piston 54 and are connected via control lines 62, 64 to an electromagnetically actuable 4/3-way switching valve 66. The latter has a first switching position 66a, in which the first pressure space 58 is connected to a pressure medium line 68 and the second pressure space 60 is connected to a tank line 70. In a second switching position 66b, the second pressure medium space 60 is connected to the pressure medium line 68 and the first pressure medium space 58 is connected to the tank line 70. Here, the first switching position 66a brings about a displacement of the piston 54 in such a way that the first transmission stage 46 is engaged via the claw coupling 50, and the second switching position 66b brings it about that the second transmission stage 48 is engaged via the piston 54 and the claw coupling 50.

The 4/3-way switching valve 66 and the actuating cylinder 56 are combined to form one unit. In addition, said unit has two end position switches 72, 74, via which the successful shifting (engaging) of the respective transmission stage 46, 48 can be detected using the position of the piston 54. The two end position switches 72, 74 are connected in each case via a signal line to the control unit 28. The 4/3-way switching valve 66 is connected via the pressure medium line 68 to a feed pump 76.

The hydrostatic transmission 4 has a variable, continuously adjustable transmission range. The manual transmission 6 which is connected downstream of it serves to cover a required speed range of the traction drive 1. Here, the transmission arrangement 3 is configured in such a way that the manual transmission 6 can be shifted during driving operation.

The shifting or changing of the transmission stages 46, 48 can be controlled in an automated manner via the control unit 28. For this purpose, the transmission arrangement 3 has a rotational speed sensor 76, by which the rotational speed $n_A$ of the output shaft 22 can be detected. In addition, it has a rotational speed sensor 78 for detecting the rotational speed $n_{HM}$ of the input shaft 18. Furthermore, the second hydraulic machine 14 has a position detection unit 32 which is configured as a proximity switch and via which the zero displacement volume of the second hydraulic machine 14 can be detected. This is optional, which will be described in greater detail further below.

The first transmission stage 46 has a gearwheel 80 which is coupled fixedly to the input shaft 20 and is in permanent engagement with a movable gear 82 which can be coupled to the output shaft 22 via the claw coupling 50. Accordingly, the second transmission stage 48 has a gearwheel 84 which is coupled fixedly to the input shaft 20 and a movable gear 86 which is permanently in engagement with said gearwheel 84 and can be coupled to the output shaft 22 via the claw coupling 50.

In accordance with FIG. 1, the first hydraulic machine 8 has an adjusting unit 88 for adjusting its first displacement volume $V_{HP}$, and the second hydraulic machine 14 has an adjusting device 90 for adjusting its second displacement volume $V_{HM}$. The adjusting device 90 is actuated electroproportionally (EP adjustment).

In order to adjust a bent axis (not shown) of the second hydraulic machine 14, and therefore of the second displacement volume $V_{HM}$, the adjusting device 90 has a double-acting hydraulic actuating cylinder (not shown) in the exemplary embodiment which is shown, the pressure spaces of which actuating cylinder, which act in opposite directions, can be supplied with pressure medium in each case via an electroproportionally adjustable pressure regulating valve. The electroproportional adjustment makes an infinitely variable adjustment of the displacement volume $V_{HM}$ possible. Here, the adjustment takes place proportionally with respect to the applied electric actuating current $I_{HM}$. A regulation of the second displacement volume $V_{HM}$ can have a positive identification, which is equivalent to a regulating beginning lying at a minimum actuating current at a minimum displacement volume $V_{HMmin}$ and a regulating end lying at a maximum actuating current and a maximum displacement volume $V_{HMmax}$. As an alternative, a regulation with a negative identification is possible. It is an advantage of the electroproportionally actuated adjusting device 90 that an actual value $V_{HMist}$ of the second displacement volume $V_{HM}$ corresponds substantially to the setpoint value $V_{HMsoll}$ which is transmitted by the control unit 28 to the adjusting device 90. Therefore, the second displacement volume $V_{HM}$ is known at least in a stationary operating state even without a detection. Since, however, this is not a detected value, but rather an assumed value of the displacement volume $V_{HM}$ of the second hydraulic machine 14, the position detection unit 92 is optionally provided in the exemplary embodiment. By way of said position detection unit 92, at least the important state can be detected/checked, in which freedom from torque of the input shaft 20 is requested for shifting, which is achieved in the exemplary embodiment by way of the zero displacement volume $V_{HM0}$ of the second hydraulic machine 14.

Figure 2:
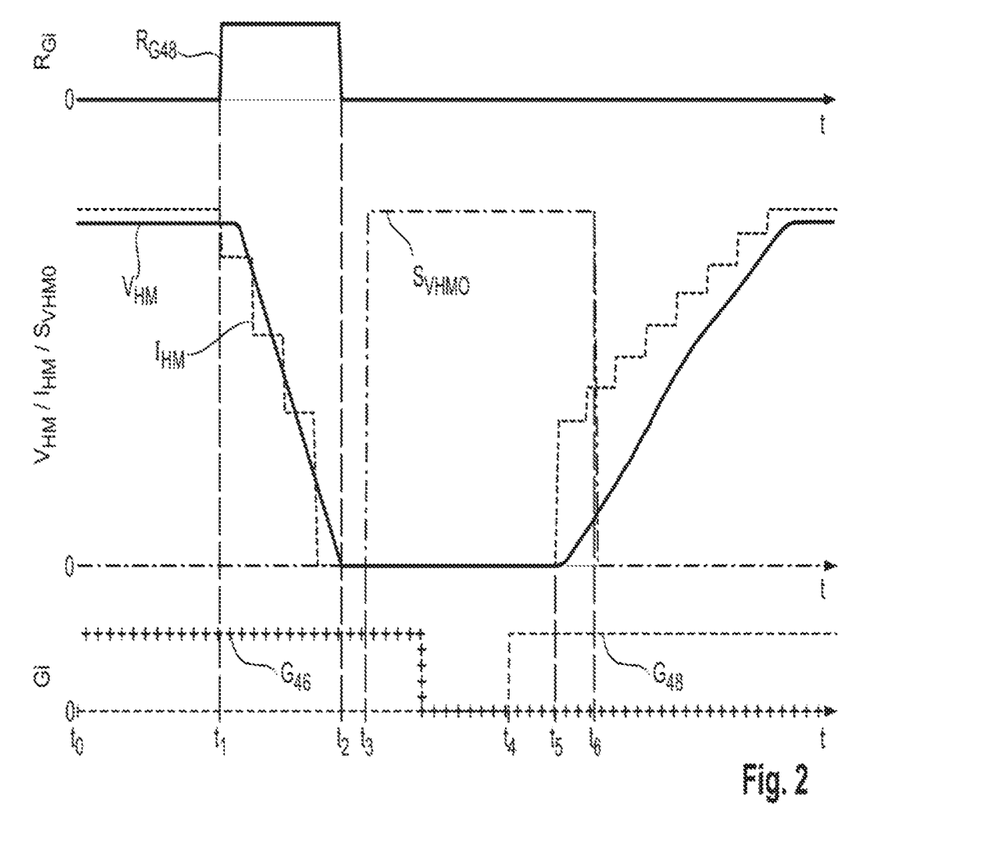
FIG. 2 shows a time diagram of a method for controlling the transmission arrangement in accordance with one exemplary embodiment.

FIG. 2 then shows a time diagram of a shifting operation in accordance with a method according to the disclosure from the first transmission stage 46 into the second transmission stage 48. A shift request $R_{Gi}$ with the special course of the shift request $R_{G48}$ for the second transmission stage 48 is shown from top to bottom. Furthermore, the time diagram of the second displacement volume $V_{HM}$ of the second hydraulic machine 14, and of the actuating current $I_{HM}$ for the adjustment of the second displacement volume $V_{HM}$ of the second hydraulic machine 14 and, superimposed in the same diagram onto the two last-mentioned diagrams, an output signal $S_{VHM0}$ of the control unit 28, which specifies when the zero displacement volume $V_{HM0}$ of the second hydraulic machine 14 is determined via said control unit 28 in accordance with the disclosure, in particular in a model-based manner. The lowermost part of the diagram according to FIG. 2 shows the time diagram of the respective engaged transmission stage G, with the change from the first transmission stage 46 to the second transmission stage 48.

Starting from a time $t_0$, at which the first transmission stage 46 is engaged in accordance with FIG. 2, the adjusting device 90 of the second hydraulic machine 14 is energized with a current $I_{HM}$ which corresponds to an existing setpoint value $V_{HMsoll\ 0}$ of the displacement volume $V_{HM}$. There is not yet a shift request $R_{Gi}$. At the time $t_1$, a shift request $R_{G48}$ for changing the first transmission stage 46 into the second transmission stage 48 is then issued by the gear selection device 32 in accordance with FIG. 1 to the control unit 28.

Firstly, the start of a time measurement of an adjustment time in the control unit 28 and secondly a setpoint value change $\Delta V_{HMsoll}$ are linked to the shift request $R_{G48}$. Here, for shifting purposes, the existing setpoint value $V_{HMsoll\ 0}$ is lowered to a new setpoint value $V_{HMsoll\ n}=0$, which is equivalent to it being intended for the second displacement volume $V_{HM}$ to be lowered to zero. This is implemented via the control unit via a stepped ramp function of the actuating current $I_{HM}$ of the adjusting device 90 in accordance with FIG. 2. Accordingly, the adjustable bent axis of the second hydraulic machine 14 follows and this results in a diagram $V_{HM}$ in accordance with FIG. 2. The zero displacement volume $V_{HM}=0$ is reached by the second hydraulic machine 14 at the time $t_2$. Via the control unit 28, a (somewhat greater) adjustment time $t_3$ has been calculated in a model-based manner as a function of the setpoint value change $\Delta V_{HMsoll}$, the temperature T and the working pressure p of the working pressure medium and the dynamic adjustment behavior of the second hydraulic machine 14. If the time measurement then reaches the adjustment time $t_3$, the control unit 28 outputs the signal $S_{VHM0}$. In principle, a virtual, model-based zero position switch is thus realized via the control unit 28. It is then to be assumed with a high degree of certainty that the input shaft 20 of the manual transmission 6 is free from torque and the shifting operation into the second transmission stage 48 (a disengagement of the first transmission stage 46 and an engagement of the second transmission stage 48) can thus take place without damage.

In a somewhat delayed manner with respect to the adjustment time $t_3$, the claw coupling 50, more precisely its actuator 52, is then first of all shifted hydraulically into a neutral position, and the first transmission stage 46 is therefore disengaged, via the control unit 28 in accordance with FIG. 1. In this position, the synchronization of the input shaft 20 (driving shaft 18) with the output shaft 22 takes place. When the rotational speeds of the input shaft 20 and the output shaft 22 are synchronized in accordance with the new transmission ratio of the second transmission stage 48, which can be checked by means of the rotational speed detection units 76, 78 and the control unit 28, the control unit 28 switches the 4/3-way switching valve 66 into its second switching position 66b. The second pressure medium space 60 is then loaded with pressure medium from the pressure medium line 68, and the piston 54 engages the actuator 52 and therefore the claw coupling into the movable gear 86, as a result of which the output shaft 22 is connected fixedly to the movable gear 86 so as to rotate with it, and the second transmission stage 48 is shifted. This corresponds to the time $t_4$.

After a short time period, up to the time $t_5$, the stepped raising of the setpoint value $V_{HMsoll}$ of the second displacement volume $V_{HM}$ takes place according to FIG. 2 via the control unit 28 by means of the stepped raising of the actuating current $I_{HM}$ of the adjusting device 90. Accordingly, the second displacement volume $V_{HM}$ of the second hydraulic machine 14 follows and increases. In a somewhat delayed manner, at the time $t_6$, this increase is detected by the position detection unit 92, whereupon the signal $S_{VHM0}$ of the control unit 28 is switched off, and the control unit therefore reports that the second displacement volume $V_{HM}$ does not equal zero.

The depicted procedure in accordance with FIG. 2 describes a method according to the disclosure for the model-based determination of an, in particular, load-free, torque-free state of the second hydraulic machine 14 which drives the manual transmission 6. In this way, the influence of the temperature, the pressure and/or a series variation of the second hydraulic machine 14 can be taken into consideration, which has the advantage in comparison with conventional, time-based, approximated actuations that less time reserve is to be provided during the shifting. If, in the case of said conventional actuation, the parameterization of the shifting operation still has to take place comparatively conservatively, with a temporal safety time reserve, it can now take place earlier when freedom from torque of the input shaft 20 is estimated to be present. This thus results in a shortened shift time in comparison with the conventional actuation. A traction force interruption which is associated with the shift operation is therefore reduced, with the result that resulting, critical situations also no longer occur or occur more rarely.

Said position detection unit 92 affords the option, if the displacement volume $V_{HM}$ is not pivoted in the direction of zero on account of technical defects (for example, of the second hydraulic machine 14 or its adjustment device 90) despite the presence of a shift request $R_{Gi}$ that said state can be detected. As a consequence, the control unit 28 can then cause no shifting to take place despite the shift request $R_{Gi}$. This protects the manual transmission 6 against damage.

Figure 3:
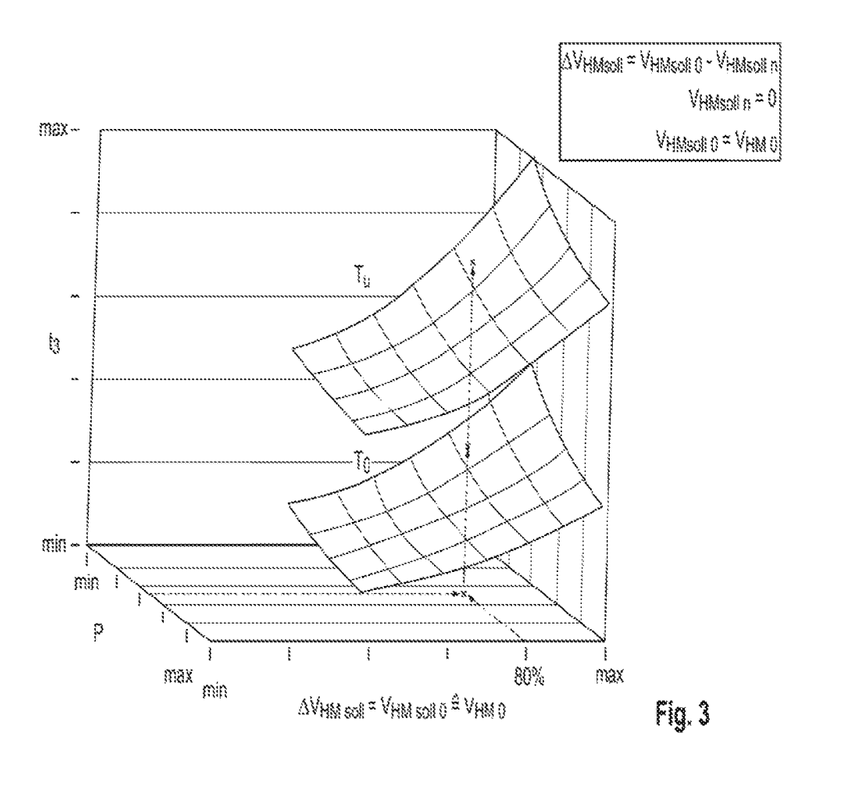
FIG. 3 shows a characteristic diagram of an adjustment time as a function of a working pressure medium temperature, a working pressure and a setpoint value change of a displacement volume of a hydraulic machine of the transmission arrangement in accordance with FIG. 1.

FIG. 3 shows a characteristic diagram of the adjustment time $t_3$ as a function of the working pressure p and different temperatures $T_o$ operating temperature (for example, 60° C.), $T_u$ warm-up temperature (for example, 20° C.) of the working pressure medium. Furthermore, the characteristic diagram is shown as a function of the setpoint value change $\Delta V_{HMsoll}$ of the displacement volume $V_{HM}$. Here, the setpoint value change $\Delta V_{HMsoll}$ is calculated from the difference of the existing and the new setpoint value $V_{HMsoll\ 0}$ and $V_{HMsoll\ n}$. Since the new setpoint value $V_{HMsoll\ n}=0$ in the exemplary embodiment, the setpoint value change $\Delta V_{HMsoll}$ is equal to the existing setpoint value $V_{HMsoll\ 0}$ in the case which is shown. On account of the electroproportional actuation, it is the case that the existing setpoint value $V_{HMsoll\ 0}$ corresponds with a sufficiently high accuracy to the actual, existing value $V_{HM\ 0}$. It can be seen that the temperature influence results in a high variance of the resulting adjustment time $t_3$. This applies similarly, in particular, to the influence of the pressure p.

The characteristic diagram in accordance with FIG. 3 can be determined, in particular is determined, experimentally, in particular by way of the measurement of a plurality of working points of the hydraulic machine 14, and is stored in the control unit 28. The method according to the disclosure is stored in the control unit 28 for execution, and accesses the characteristic diagram when executing the determination of the adjustment time $t_3$ from said variables.

The temperature T can be transmitted by a temperature detection unit and the operating pressure p can be transmitted from a pressure detection unit of the transmission arrangement to the control unit 28.

Figure 4:
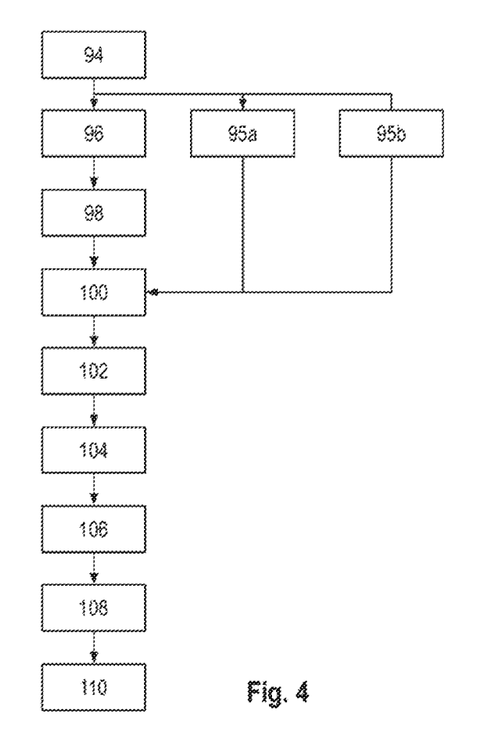
FIG. 4 shows a block diagram of the method in accordance with FIG. 2.

FIG. 4 shows one exemplary embodiment of the method in a block diagram. Sequential steps are shown: receiving 94 of a shift request $R_{G48}$; parallel steps in sequence: start 95a of a time measurement of an adjustment time, determination according to the disclosure 95b of the adjustment time $t_3$, and checking 96 of at least one shift condition; after the checking 96, the following steps take place sequentially: actuation 98 of the adjusting device 90 with a new setpoint value $V_{HMsoll\ n}$; determination 100 that the time measurement has reached the determined adjustment time $t_3$; actuation 102 of a control valve 66 of the manual transmission 6 for disengaging the engaged transmission stage 46; determination 104 that the previously engaged transmission stage 46 is disengaged; synchronization 106 of the new transmission stage 48, engagement 108 of the new transmission stage; determination 110 that the new transmission stage 48 is engaged.

A hydraulic motor having an adjustable displacement volume is disclosed, via which hydraulic motor a manual transmission can be driven. It has a control unit, via which a reset time from a finite displacement volume to a displacement volume which is equal to zero or close to zero can be determined as a function of a dynamic adjustment behavior of the hydraulic motor, which dynamic adjustment behavior is stored in the control unit, with consideration of at least one state variable of the hydraulic motor or its working pressure medium. Furthermore, a transmission arrangement having the hydraulic machine and a manual transmission which is coupled to it is disclosed. In addition, a method at least for controlling a shift operation of the transmission arrangement is disclosed, via which method the reset time from a finite displacement volume to a displacement volume which is equal to zero or close to zero can be determined as a function of the dynamic adjustment behavior of the hydraulic motor, which dynamic adjustment behavior is stored in the control unit, with consideration of the at least one state variable of the hydraulic motor or its working pressure medium.

LIST OF DESIGNATIONS

1 Traction drive
2 Drive machine
3 Transmission arrangement
4 Hydrostatic transmission
6 Manual transmission
8 First hydraulic machine
10 First working line
12 Second working line
14 Second hydraulic machine
16 Drive shaft
18 Driving shaft
20 Input shaft
22 Output shaft
24 Differential
26 Axle
28 Control device
30 Pivoting angle detection unit
32 Gear selection device
34 Driving direction selection device
36 Accelerator pedal
38 Crawler gear selection device
40 Brake pedal
42 Automatic selection device
44 CAN bus
44a; 44b Signal line
46 First transmission stage
48 Second transmission stage
50 Claw coupling
52 Actuator
54 Piston
56 Actuating cylinder
58 First pressure space
60 Second pressure space
62, 64 Control line
66 4/3-way switching valve
66a First switching position
66b Second switching position
68 Pressure medium line
70 Tank line
72, 74 End position switch
76, 78 Rotational speed sensor
80, 84 Gearwheel
82, 86 Movable gear
88 Adjusting device
90 Adjusting device
92 Position detection unit
94 Receiving step
95a Time measurement of adjusting time step
95b Determination of adjusting time step
96 Checking step
98 Actuation step
100 Determination step
102 Actuation step
104 Determination step
106 Synchronization step
108 Engagement step
110 Determination step
$R_{Gi}$ Shift request
$R_{G48}$ Shift request, second transmission stage
$V_{HM}$ Second displacement volume
$I_{HM}$ Actuating current
$V_{HMsoll}$ Setpoint value, second displacement volume
$\Delta V_{HMsoll}$ Setpoint value change
$V_{HMsoll\ 0}$ Existing setpoint value
$V_{HMsoll\ n}$ New setpoint value
$t_3$ Adjusting time
$S_{VHM0}$ Signal, second displacement volume

What is claimed is:

1. A hydraulic machine for a transmission arrangement, comprising:
    an adjustable displacement volume; and
    an adjusting device configured to adjust the displacement volume, the adjusting device connected to a control unit via which the adjusting device is configured to be actuated in accordance with a setpoint value of the displacement volume,
    wherein the control unit is configured such that, via the control unit, at least one dynamic parameter of the adjustment is configured to be determined as a function of a setpoint value change of the displacement volume from an existing setpoint value toward a new setpoint value and as a function of at least one state variable of a working pressure medium of the hydraulic machine and as a function of a dynamic model of the adjustment behavior of the hydraulic machine, and
    wherein the dynamic model models the displacement volume as a function of the setpoint value change and the dynamic parameter.

2. The hydraulic machine according to claim 1, wherein the dynamic parameter is an adjustment time, after the expiration of which the new setpoint value is configured to be reached by the displacement volume.

3. The hydraulic machine according to claim 1, wherein the new setpoint value is equal to zero, or the new setpoint value is dimensioned to compensate for a moment of inertia of the hydraulic machine.

4. The hydraulic machine according to claim 1, wherein the at least one state variable is a working pressure or a temperature of the working pressure medium, or state variables are a working pressure and a temperature of the working pressure medium.

5. The hydraulic machine according to claim 1, wherein the dynamic parameter, the setpoint value change, and the at least one state variable are stored in the form of a characteristic diagram in the control unit.

6. The hydraulic machine according to claim 1, wherein the dynamic model of the displacement volume as a function of the setpoint value change and the dynamic parameter i-s are stored in the control unit.

7. The hydraulic machine according to claim 1, further comprising a detection device via which at least one zero value or a zero position of the displacement volume is configured to be detected.

8. A transmission arrangement, comprising:
a first hydraulic machine configured to be coupled to a drive machine; and
a second hydraulic machine arranged in a hydraulic circuit and configured to be operated as a hydraulic motor, the second hydraulic machine including:
an adjustable displacement volume, and
an adjusting device configured to adjust the displacement volume, the adjusting device connected to a control unit via which the adjusting device is configured to be actuated in accordance with a setpoint value of the displacement volume,
wherein the control unit is configured such that, via the control unit, at least one dynamic parameter of the adjustment is configured to be determined as a function of a setpoint value change of the displacement volume from an existing setpoint value toward a new setpoint value and as a function of at least one state variable of a working pressure medium of the hydraulic machine and as a function of a dynamic model of the adjustment behavior of the hydraulic machine,
wherein the second hydraulic machine is configured to be coupled to a manual transmission of the transmission arrangement, the manual transmission having at least two transmission stages with the result that a torque is configured to be transmitted between the second hydraulic machine and the manual transmission,
wherein a shift of the transmission stages is configured to be controlled via the control unit of the transmission arrangement as a function of the determined, dynamic parameter,
wherein the displacement volume of the second hydraulic machine is configured to be adjusted to zero or close to zero for shift purposes, and
wherein the dynamic model models the displacement volume as a function of the setpoint value change and the dynamic parameter.

9. The transmission arrangement according to claim 8, wherein the dynamic parameter is an adjustment time, after the expiration of which the new setpoint value is configured to be reached by the displacement volume, and wherein a disengagement of a transmission stage is configured to be controlled as a function of the adjustment time.

10. The transmission arrangement according to claim 8, wherein the dynamic parameter, the setpoint value change, and the at least one state variable are stored in the form of a characteristic diagram in the control unit, and wherein at least one further control signal is configured to be derived via the control unit from one or more of the characteristic diagram and the dynamic model.

11. The transmission arrangement according to claim 8, wherein the transmission arrangement is configured for a traction drive.

12. A method for controlling a shift or a change of transmission stages of a transmission arrangement that includes a first hydraulic machine configured to be coupled to a drive machine and a second hydraulic machine arranged in a hydraulic circuit and configured to be operated as a hydraulic motor, the second hydraulic machine including an adjustable displacement volume and an adjusting device configured to adjust the displacement volume, the adjusting device connected to a control unit via which the adjusting device is configured to be actuated in accordance with a setpoint value of the displacement volume, the control unit is configured such that, via the control unit, at least one dynamic parameter of the adjustment is configured to be determined as a function of a setpoint value change of the displacement volume from an existing setpoint value toward a new setpoint value and as a function of at least one state variable of a working pressure medium of the hydraulic machine and as a function of a dynamic model of the adjustment behavior of the hydraulic machine, the second hydraulic machine is configured to be coupled to a manual transmission of the transmission arrangement, the manual transmission having at least two transmission stages with the result that a torque is configured to be transmitted between the second hydraulic machine and the manual transmission, wherein a shift of the transmission stages is configured to be controlled via the control unit of the transmission arrangement as a function of the determined, dynamic parameter, and wherein the displacement volume of the second hydraulic machine is configured to be adjusted to zero or close to zero for shift purposes, the method comprising:
receiving a shift request by way of the control unit;
actuating the adjustment device via the control unit in accordance with a new setpoint value of the displacement volume, which new setpoint value is linked to the shift request; and
determining the dynamic parameter via the control unit as a function of the existing setpoint value, the new setpoint value, the at least one state variable, and the dynamic model of the adjustment behavior of the hydraulic machine,
wherein the dynamic model models the displacement volume as a function of the setpoint value change and the dynamic parameter.

13. The method according to claim 12, wherein the dynamic parameter is an adjustment time, the method further comprising:
actuating the manual transmission for disengaging the currently engaged transmission stage, at the expiration or after the expiration of the adjustment time, via the control unit.

14. The method according to claim 12, further comprising:
determining that the transmission stage is disengaged via the control unit;
synchronizing the new transmission stage via the control unit;
actuating the manual transmission in order to engage the new transmission stage via the control unit;

determining that the new transmission stage is engaged; and increasing the displacement volume of the second hydraulic machine via the control unit.

15. The method according to claim 12, further comprising:

checking at least one shift condition via the control unit before actuating the adjustment device in accordance with the new setpoint value for the displacement volume, which new setpoint value is linked to the shift request.

* * * * *

UNITED STATES PATENT AND TRADEMARK OFFICE
CERTIFICATE OF CORRECTION

PATENT NO. : 10,683,930 B2
APPLICATION NO. : 16/045060
DATED : June 16, 2020
INVENTOR(S) : Wogrin et al.

Page 1 of 1

It is certified that error appears in the above-identified patent and that said Letters Patent is hereby corrected as shown below:

In Claim 6, at Column 13, Lines 16-17, "dynamic parameter i-s are stored" should read
--dynamic parameter are stored--.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*